Sept. 22, 1959 R. LUCIEN 2,905,195
ELECTRO-MAGNETICALLY CONTROLLED HYDRAULIC DISTRIBUTOR
Filed Oct. 9, 1956 4 Sheets-Sheet 1

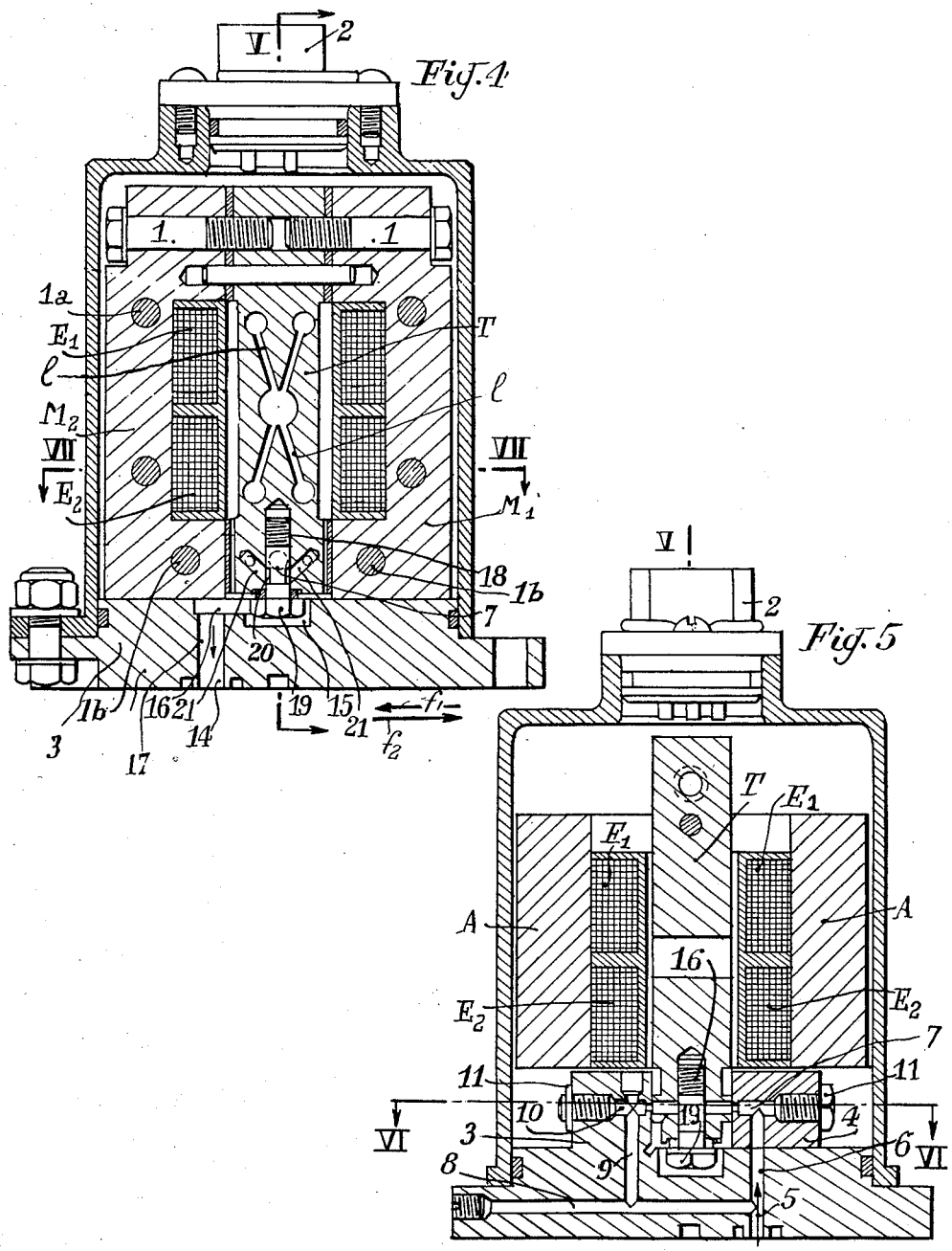

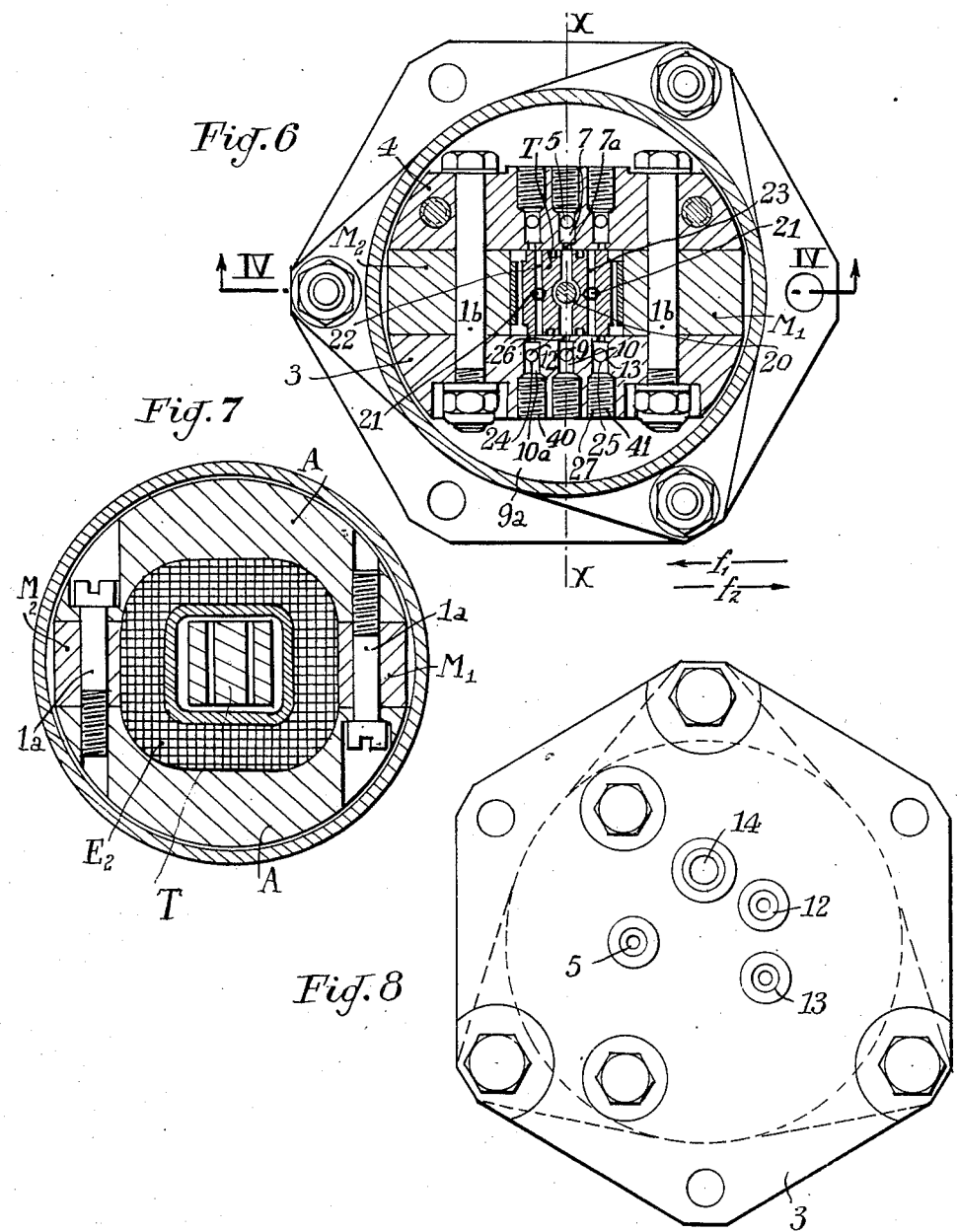

United States Patent Office 2,905,195
Patented Sept. 22, 1959

2,905,195

ELECTRO-MAGNETICALLY CONTROLLED HYDRAULIC DISTRIBUTOR

Rene Lucien, Neuilly-sur-Seine, France, assignor to Société à responsabilité limitée: Recherches Etudes Production R.E.P., Paris, France, a corporation of France Application October 9, 1956, Serial No. 614,929

Claims priority, application France November 28, 1955

4 Claims. (Cl. 137—623)

There exists a large number of hydraulic distributors which have as their object the hydraulic control of servo-mechanisms. These distributors are composed of a fixed member and a moving member. The fixed member is provided with an admission orifice coupled to a conduit of liquid under pressure, with an orifice coupled to a conduit which returns to the reservoir, and with at least one orifice coupled to a utilization conduit which terminates at the servo-motor. Internal conduits formed in the fixed member and in the moving member enable the conduit or conduits of utilization to be put into communication with the pressure conduit or conduits or with the reservoir, depending on the position of the moving member. In the case of distributors which control a double-acting servo mechanism, two orifices are provided coupled to two utilization conduits and, depending on the position of the moving member, a utilization conduit is put simultaneously into communication with the pressure conduit and the other with the reservoir and vice versa.

The most common type of distributor comprises a simple slide-valve as its moving member, which may be either cylindrical or flat and which operates by means of a sliding movement. There exist also distributors in which their cylindrical moving member moves in rotation.

In order to simplify the description, the moving member will hereinafter be referred to as a "slide-valve" irrespective of the type of movement, whether it be lateral or rotational, which is given to it. The known devices have the drawback of being a source of static friction of fairly large value which gives rise to certain phenomena of adhesion which are well known to users. The means employed to reduce the phenomena of friction and adhesion have not given very satisfactory results up to the present time.

The invention has for its object the provision of a hydraulic distributor which, by its very structure, practically excludes all effects of adhesion, and in which the movements of the slide-valve—which are in principle of small amplitude—may be of high frequency. This slide-valve furthermore constitutes one of the main characteristic features of the invention.

In its most simple form of construction, the slide-valve comprises a member fixed to the body of the distributor by a then coupling web or bond which, by reason of its small thickness in one of its dimensions, has a certain flexibility which enables the said member to be movable angularly in a plane which contains this small thickness.

In a further form of construction, the slide-valve comprises two members which are attached on the one hand to the body of the distributor by thin flexible parallel web or bonds, and on the other hand, are coupled together by a third member playing the part of a crank-arm, to which they are coupled by thin flexible webs or bonds similar to those previously referred to and orientated in the same direction. In these conditions, the four bonds may be compared to four parallel pivotal axes. If their reciprocal positions are such that they form, when at rest, four ridges of a rectangular parallelepiped, the third member will be capable of being moved elastically with a circular movement of translation around its position of equilibrium. However, for small amplitudes of movement, this translation can be assumed to be a straight line movement, the components of the movement of each point along the radius of gyration being small with respect to the tangential component. If this third member is then given the function of the distributor member of the slide-valve, the apparatus will fall into the category of distributors having straight line motion of the slide-valve.

Within the scope of the invention, the force which causes the movements of the slide-valve may be of a diverse nature, manual or automatic, mechanical, electrical, electro-magnetic, etc.

In one form of construction which will be described below by way of example, the slide-valve forms the core of an electro-magnet in which an electric current induces a magnetic field which moves the slide-valve from its position of equilibrium.

In the accompanying drawings:

Figs. 4 to 10 show a distributor provided with a slide-valve in accordance with Fig. 3, with electro-magnetic control.

Fig. 4 is a cross-section taken along the line IV—IV of Fig. 6.

Fig. 5 is a cross-section along the line V—V of Fig. 4.

Fig. 6 is a cross-section along the line VI—VI of Fig. 5.

Fig. 7 is a cross-section taken along the line VII—VII of Fig. 4.

Fig. 8 is a view of the underside of the distributor.

Figs. 9 and 10 are flow diagrams illustrating a fluid porting arrangement with the slide valve positioned in two different positions.

Figure 1:
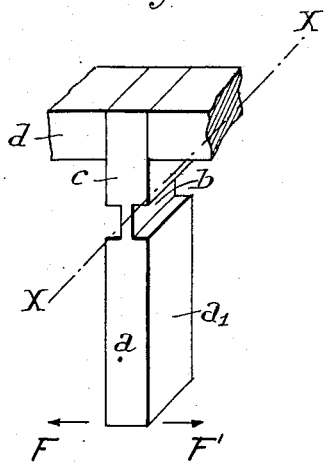
Figs. 1 and 2 show diagrammatically in perspective the two typical forms of construction of the slide-valve of a distributor in accordance with the invention.

The slide-valve of a distributor, shown in its most simple form in Fig. 1, comprises a moving member $a$ in the form of a rectangular parallelepiped, coupled by a thin flexible web or bond $b$ to a portion $c$ built into the fixed body of the distributor. The member $a$, under the action of forces F or F' at right angles to its face $a_1$, can be subjected to angular movements similar to rotations about an axis X—X passing through the bond $b$ and parallel to the greatest dimension of this bond.

Figure 2:
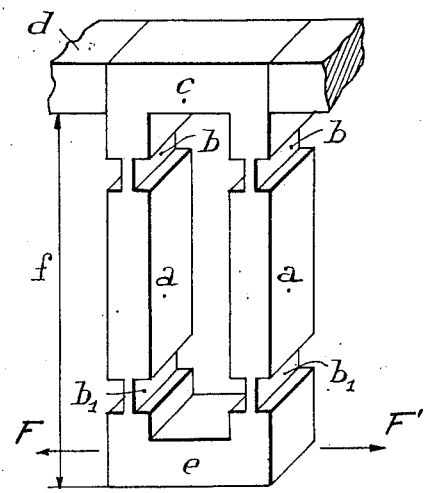

The slide-valve shown in Fig. 2 comprises two members $a$ parallel and of the same length, each coupled by a thin flexible web or bond $b$ to a member $c$ built into the body $d$ of the distributor. The flexible webs or bonds $b$ are parallel. A transverse member $e$ is coupled to each of the members $a$ by a thin web or bond $b_1$, the two webs or bonds $b_1$ being parallel to the bonds $b$. As a result, the member $e$ can make a lateral movement in response to forces F and F' about its position of equilibrium which is comparable, for small amplitudes, to a straight-line movement.

Figure 3:
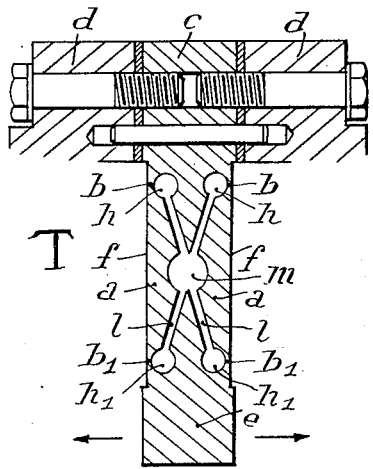
Fig. 3 is an alternative form of construction of the slide-valve shown in Fig. 2.

The slide-valve T shown in Fig. 3—with the same reference numbers as for the previous figures—is a form of construction of the preceding embodiment carried into practice. It is formed by a body in the shape of a rectangular parallelepiped in which are pierced in the immediate vicinity of two opposite faces $f$—$f$, four holes $h$—$h$ and $h_1$—$h_1$, the centers of which form the apices of a parallelogram and which are coupled together diagonally two by two by slots $l$—$l$. The very small thickness of material left between the holes and the adjacent faces corresponds to the flexible bonds $b$—$b$ and $b_1$—$b_1$ of Fig. 2, permitting of the alternate movements of the slide-valve on each side of its position of equilibrium. As regards the slots $l$—$l$, these constitute the space between the members $a$—$a$. At the point of intersection of these slots is formed a perforation $m$ so as to permit of the passage of the saw in cutting the slots.

The complete distributor shown by way of example in Figs. 4 to 8, comprises, between the two poles of a permanent magnet A, the slide-valve T of magnetic material, the structure of which has been described above. This slide-valve is built-in at one of its extremities between two masses of magnetic metal $M_1$—$M_2$ which close a magnetic circuit with the magnet A. The assembly is effected by means of two bolts 1 screwed into the slide-valve T and by bolts $1a$ which lock together the two pole masses $M_1$—$M_2$ and the magnet A.

The elastic deformations of the slide-valve T about the flexible bonds formed by the thin portions $b$—$b_1$ are produced by the action of windings $E_1$—$E_2$ which are housed between the slide-valve T and the magnetic masses $M_1$—$M_2$ and receive an electric current, in one direction or the other, by means of a current supply plug with three pins, at the upper part of the apparatus. The magnetic masses $M_1$—$M_2$ are mounted on a non-magnetic seating formed by a base 3 and a member 4 which is assembled to it by means of bolts $1b$ (see Fig. 6).

The hydraulic distribution circuit is constituted in the following manner: a conduit 6 is pierced at orifice 5 (see Figs. 5 and 8) through the base 3 for the incoming supply of fluid under pressure, the conduit 6 terminating in a transverse conduit 7 in the member 4. In the same way, conduits 8 and 9 bring the fluid to a conduit 10 opposite the conduit 7. The conduits 7 and 10 terminate opposite the slide-valve T in small orifices of $7a$ and $10a$ and they are normally closed at their opposite extremities by plugs 11. In the base 3 are also formed orifices 12 and 13 (see Fig. 8) for the connection of two utilization conduits, respectively which lead the fluid to the apparatus to be controlled, as well as an orifice 14 which is the return of the fluid to the tank.

The apparatus is designed so that the deformation of the slide-valve T in the direction of the arrow $f_1$ brings the fluid under pressure to the orifice 12 and puts the utilization conduit ending in the orifice 13 in communication with the orifice 14 and consequently with the tank. Conversely, the deformation of the slide-valve T in the direction of the arrow $f_2$ causes fluid under pressure to pass into the orifice 13 and connects the other utilization conduit which ends in the orifice 12 in communication with orifice 14 to exhaust (the tank).

These results are obtained by the following means:

A central well 15 formed in the base 3 communicates with the tank by means of the conduits 16 and 17 which are connected with the return orifice 14 (see Fig. 4). In the longitudinal axis of the slide-valve T, there is drilled a hole 18 into the end of which is screwed a bolt 19 which closes it at its base (see Figs. 4 and 5), with the interposition of a fluid-tight joint. This bolt is machined over a part of its height, i.e. along the shank portion of bolt 19, so as to form, at the level of the conduits 7—10, an annular chamber 20 (see Fig. 6), into which discharge the oblique conduits 21, meeting respectively the transverse conduits 22—23 (see Figs. 4 and 6) which are symmetrical with respect to the plane of symmetry X—X (see Fig. 6). The orifices 12—13 communicate respectively with vertical channels 24—25 (see Fig. 6), in a manner similar to the way orifice 5 communicates with channel 7, which discharge into the transverse conduits 26—27 which are provided facing the slide-valve T with orifices of small caliber and are closed at the opposite extremities by means of plugs. A symmetrical arrangement is provided on the member 4. The transverse channels of the slide-valve T are spaced apart in such manner that when at rest the channels 22—23 are closed by the members 3—4 and that a deformation of the slide-valve, for example its displacement towards left as viewed in Fig. 6, will place the channel 22 in communication with the channel 24. The result is that the orifice 12 and the utilization conduit which is coupled to it are put under pressure. A deformation of the slide-valve towards the right would act in the same way to put the orifice 13 and the utilization conduit which is coupled to it under pressure. On the other hand, the extremities of the faces of the slide-valve which slide along the internal faces of the members 3 and 4 are fairly close to each other in order that, when one of the conduits 24 and 25 is put under pressure, the other is no longer closed by the slide-valve. The utilization conduit which is coupled to the conduit 24 or 25 which is not put under pressure is then put into communication with the tank by the passage of the liquid into the lateral space, from which it flows into the well 15 and from thence through the passages 16 and 17 and the orifice 14 towards the tank.

Figure 9:
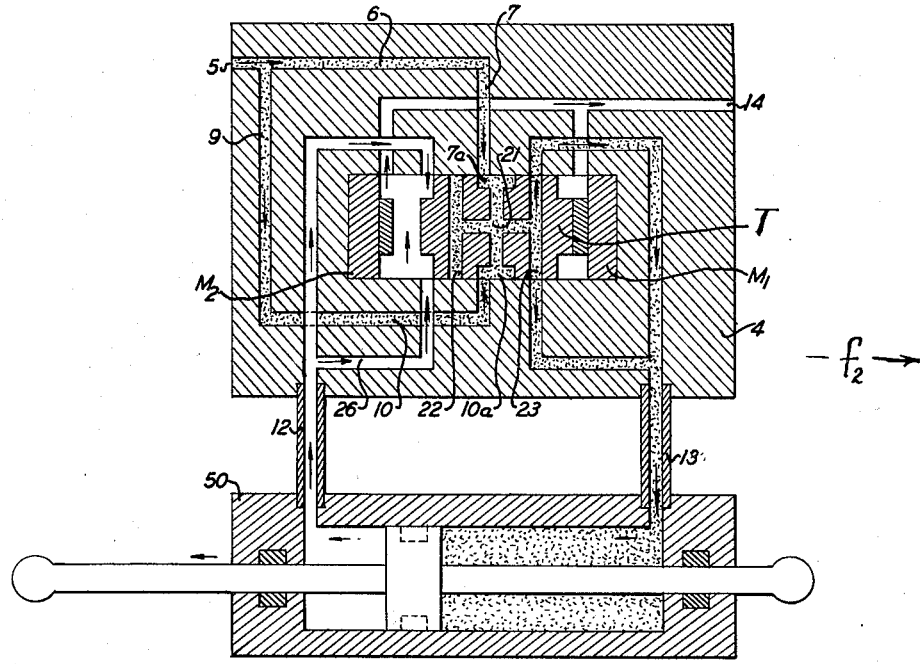
Figure 10:
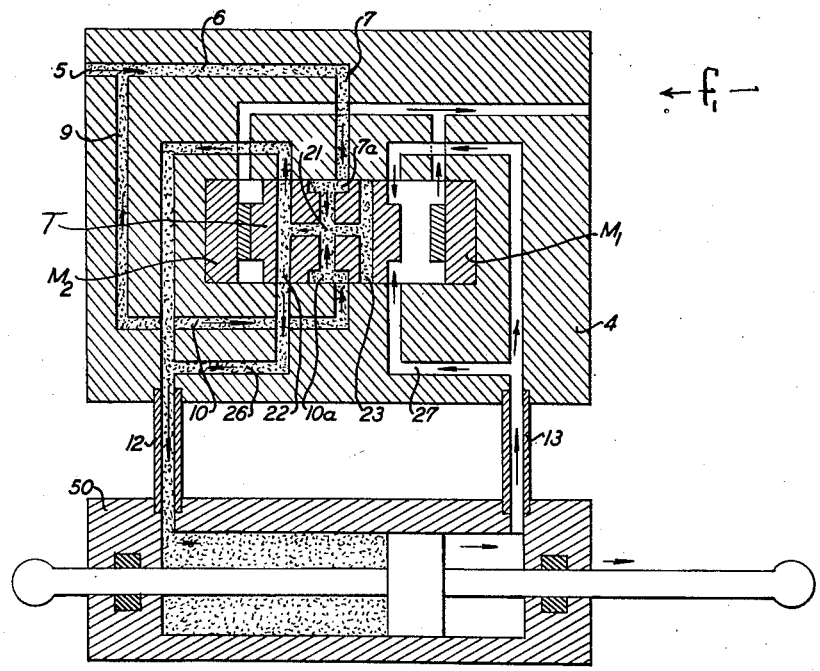

Referring now more particularly to Figs. 9 and 10, fluid inlet 5 is coupled to conduits 6 and 9 for communication with utilization conduit 12 or 13 depending upon the position of slide valve T. Fig. 9 illustrates the slide valve T in its position when moved in the direction $f_2$ and Fig. 10 illustrates the slide valve T in its position when moved in the direction $f_1$. It will be noted that the shaded paths indicate the direction of fluid flow under pressure to the apparatus 50 (e.g. a servo motor) to be controlled, and the unshaded paths indicate the paths of and direction of fluid flow when exhausted to the reservoir from the apparatus 50 to be controlled. The reference numerals indicate the same structure as in the previous figures with the arrows in the fluid paths and those adjacent thereto indicating the direction of fluid flow in response to the movement of the slide valve T.

By virtue of the arrangements adopted, which permit of the provision between the slide-valve T and the surfaces of the members 3 and 4 between which it slides, of a clearance as small as may be desired, and also, by virtue of the equilibrium of the pressures of the fluid which are applied at right angles to these surfaces and which do not tend to increase this clearance, the leakages between these surfaces are extremely small.

What I claim is:

1. An electromagnetically controlled hydraulic distributor comprising in combination a distributor body of non-magnetic material, a slide-valve of magnetic material fixed to the said body by at least one elastic member which permits it to make pendular oscillations; the distributor body and the slide-valve being provided with mating surfaces in sliding contact, the said distributor body having an admission conduit, a return conduit and two utilization conduits terminating at one of the said surfaces, the said slide-valve being provided with passages having orifices on its sliding surface, the said orifices being adapted, in an inclined position of the slide-valve, to place the admission conduit in communication with one of the said utilization conduits and the second utilization conduit in communication with the said return conduit, and to put, in a position of the slide-valve inclined in the opposite sense, the admission conduit into communication with the second utilization conduit and the first utilization conduit into communication with the return conduit, and an electromagnet surrounding the slide-valve.

2. A distributor in accordance with claim 1, wherein the distributor body is provided internally with a free space having two flat parallel surfaces, the slide-valve being enclosed by one of its extremities in the said distributor body and engaged in the said free space, the said slide-valve having two flat parallel surfaces adjusted to slide along the said flat surfaces of the distributor body, the enclosed portion of the said slide-valve and its portion engaged in the said free space being coupled by at least one elastic member which permits it to make pendular oscillations parallel to the planes of the said flat surfaces.

3. A distributor in accordance with claim 2, in which to each of the two parallel sliding planes, there correspond utilization conduits of the distributor body, passages of the said slide-valve and orifices disposed symmetrically two by two with respect to the central plane of oscillation of the slide-valve, whereby the pressure forces of the fluid on the surfaces in contact are balanced.

4. A distributor in accordance with claim 3, wherein the slide-valve is of a generally parallelepiped shape and closed by one of its extremities in the body of the said distributor, having two parallel surfaces in sliding contact with two parallel surfaces of the distributor body, the said slide-valve comprising, between its enclosed portion and the said sliding surfaces, four perforations at right angles to the said surfaces, of which two are in the vicinity of the said enclosed portion and two in the vicinity of the said surfaces, the said perforations being formed close to the longitudinal walls of the slide-valve and coupled together diagonally two by two by slots extending from one transverse wall to the other.

References Cited in the file of this patent

UNITED STATES PATENTS

| | | |
|---|---|---|
| 2,249,508 | Warner | July 15, 1941 |
| 2,692,582 | Curci et al. | Oct. 26, 1954 |
| 2,742,919 | Ray | Apr. 24, 1956 |